United States Patent
Hashimoto

(10) Patent No.: US 7,650,391 B2
(45) Date of Patent: Jan. 19, 2010

(54) SERVER DEVICE AND CLIENT-SERVER SYSTEM

(75) Inventor: Masahiro Hashimoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 503 days.

(21) Appl. No.: 11/431,525

(22) Filed: May 11, 2006

(65) Prior Publication Data

US 2006/0259591 A1   Nov. 16, 2006

(30) Foreign Application Priority Data

May 16, 2005   (JP)   ............... 2005-142359

(51) Int. Cl.
*G06F 15/167* (2006.01)
(52) U.S. Cl. .............. 709/218; 709/219; 709/223; 709/226; 709/203; 717/108
(58) Field of Classification Search ............... 709/219, 709/218, 203
See application file for complete search history.

(56) References Cited

U.S. PATENT DOCUMENTS

| | | | | |
|---|---|---|---|---|
| 6,147,977 A | * | 11/2000 | Thro et al. | ........... 370/265 |
| 6,226,788 B1 | * | 5/2001 | Schoening et al. | ........... 717/107 |
| 7,051,330 B1 | * | 5/2006 | Kaler et al. | ........... 718/106 |
| 7,225,244 B2 | * | 5/2007 | Reynolds et al. | ........... 709/223 |

FOREIGN PATENT DOCUMENTS

| | | |
|---|---|---|
| JP | 2002-7257 A | 1/2002 |
| JP | 2004-235921 A | 8/2004 |
| JP | 2004-289776 A | 10/2004 |

\* cited by examiner

*Primary Examiner*—Jeffrey Pwu
*Assistant Examiner*—Shripal K Khajuria
(74) *Attorney, Agent, or Firm*—Crowell & Moring LLP

(57) ABSTRACT

In a client-server system comprising a plurality of client terminal devices and a server device which transmits and receives information to and from the plurality of client terminal devices, the server device comprises an acquisition unit which obtains a priority of the client terminal device from a priority storage unit, based on a control request from the client terminal device, a determination unit which determines whether or not the control request is accepted, based on the obtained priority, and an execution unit which executes control in response to the control request when the determination unit determines that the control request is accepted.

6 Claims, 6 Drawing Sheets

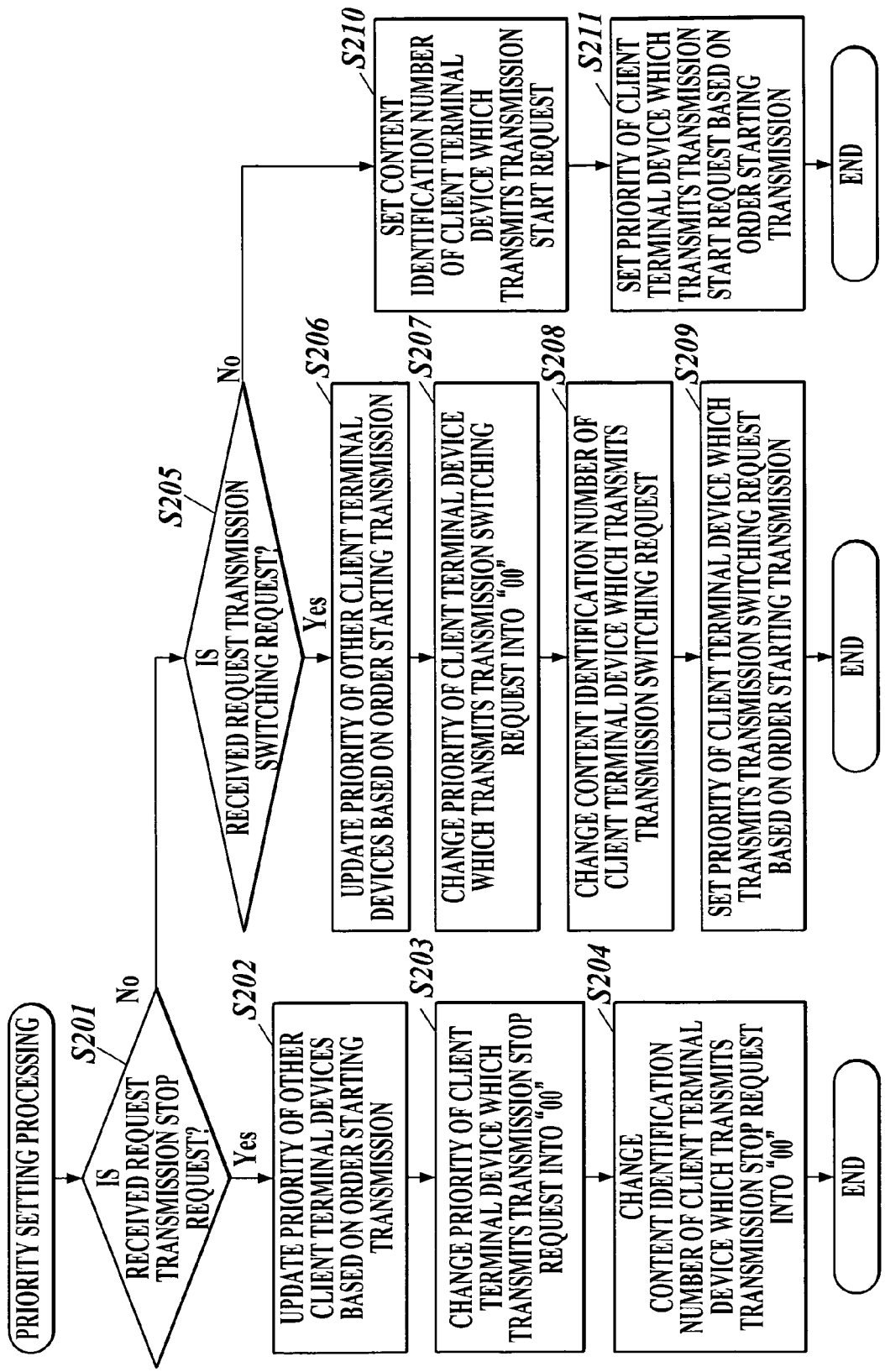

SERVER DEVICE AND CLIENT-SERVER SYSTEM

BACKGROUND OF THE INVENTION

1. Field of the Invention

The present invention relates to a server device and a client-server system.

2. Description of Related Art

In recent years, a system for providing information (content information) from a server device to a client terminal device through a network has been used. To the server device, there are connected a plurality of types of audio-video equipments such as a TV apparatus, a videorecorder, a PVR (Personal Video Recorder), a tuner of BS (Broadcasting Satellite) broadcasting or CS (Communication Satellite) broadcasting, an STB (Set Top Box), a DVD (Digital Versatile Disk) player and an audio device, so that content information corresponding to the audio-video equipments connected to the server device can be transferred and provided from the server device to the client terminal device.

When a plurality of client terminal devices are connected to one server device, there is such a problem that a long time is required to provide content information.

Therefore, there are proposed a method for sequentially providing content information in accordance with the time when each client terminal device starts a provision request of content information (see Patent Document 1), a method for setting a start time of viewing of content information and recruiting viewers of the content information until the start time (see Patent Document 2) and a method for performing scheduling of a content information provision so as to minimize a waiting time in view of selection probability of the content information (see Patent Document 3).

[Patent Document 1]

Japanese Patent Application Publication Unexamined No. 2004-289776

[Patent Document 2]

Japanese Patent Application Publication Unexamined No. 2004-235921

[Patent Document 3]

Japanese Patent Application Publication Unexamined No. 2002-007257

In a case where a plurality of client terminal devices are connected to one server device, for example, there is a problem that when the server device accepts a control request over content information from one client terminal device, a harmful influence occurs in viewing of the content information by users of the other client terminal devices. Specifically, in a case where a server device provides a first content information set to a first client terminal device and a second client terminal device, for example, there is a problem that when the server device accepts a stop control request over the first content information set from the first client terminal device, the provision of the first content information set stops although a user of the second client terminal device does not desire stopping of the provision, and as a result, an unpredictable harmful influence occurs in the viewing of the first content information set by the user of the second client terminal device. However, in Patent Documents 1, 2 and 3, such a problem is not expected.

SUMMARY OF THE INVENTION

It is an object of the present invention to provide a server device and client-server system in which an unpredictable harmful influence is prevented from occurring in viewing of content information by users of client terminal devices.

In order to accomplish the above object, in accordance with the first aspect of the invention, a client-server system, comprising:

a plurality of client terminal devices; and a server device which transmits and receives information to and from the plurality of client terminal devices, the plurality of client terminal devices and the server device being connected through a wireless network, wherein the server device comprising:

a priority storage unit which correspondingly stores content identification information for identifying content information transmitted to each client terminal device and a priority of the client terminal device in a control for the content information;

a control request reception unit which receives a control request for one content information transmitted to the one client terminal device, from one client terminal device;

an acquisition unit which obtains a priority of the one client terminal device in the control for the one content information, from the priority storage unit, based on the control request from the one client terminal device, which is received by the control request reception unit;

a determination unit which determines whether or not the control request received by the control request reception unit is accepted, based on the priority of the one client terminal device, which is obtained by the acquisition unit;

an execution unit which executes control in response to the control request when the determination unit determines that the control request is accepted; and a notification unit which gives a notice that the determination unit determines that the control request is not accepted, to the one client terminal device which transmits the control request, when the determination unit determines that the control request is not accepted, wherein when the priority of the one client terminal device is highest, the determination unit determines that the control request received by the control request reception unit is accepted, and wherein the client terminal device comprising:

a content information reception unit which receives the content information transmitted from the server device;

a notification reception unit which receives the notice that the control request is not accepted, the notice being transmitted from the notification unit; and a notification output unit which outputs the notice received by the notification reception unit.

In accordance with the second aspect of the invention, a server device which transmits and receives information to and from a plurality of client terminal devices connected through a wireless network, comprising:

a priority storage unit which correspondingly stores content identification information for identifying content information transmitted to each client terminal device and a priority of the client terminal device in a control for the content information;

a control request reception unit which receives a control request for one content information transmitted to the one client terminal device, from one client terminal device;

an acquisition unit which obtains a priority of the one client terminal device in the control for the one content information, from the priority storage unit, based on the control request from the one client terminal device, which is received by the control request reception unit;

a determination unit which determines whether or not the control request received by the control request reception unit is accepted, based on whether or not the priority of the one client terminal device, which is obtained by the acquisition unit satisfies a predetermined condition; and an execution unit which executes control in response to the control request when the determination unit determines that the control request is accepted.

Preferably, the determination unit determines that the control request received by the control request reception unit is accepted when the priority of the one client terminal device is highest.

Preferably, the server device further comprises:

a notification unit which gives a notice that the determination unit determines that the control request is not accepted, to the one client terminal device which transmits the control request, when the determination unit determines that the control request is not accepted.

Preferably, the server device further comprises:

a priority information reception unit which receives priority information on the priority in the control for the one content information, from the one client terminal device; and a priority setting unit which sets the priority of the one client terminal device in the control for the one content information, to the priority storage unit, based on the priority information received by the priority information reception unit.

Preferably, the priority is set based on order of starting transmission of the content information, the priority information reception unit receives a transmission stop request of the one content information or a transmission switching request to another content information, as the priority information, and the priority setting unit invalidates the priority of the one client terminal device which is stored in the priority storage unit, in the control for the one content information, and advances a priority of the client terminal device which has the priority lower than that of the one client terminal device, in the control for the one content information, by one step, when the priority information reception unit receives the transmission stop request of the one content information or the transmission switching request to the another content information from the one client terminal device.

According to the first aspect of the invention, the determination unit can determine, based on the priority of the one client terminal device obtained by the acquisition unit, whether the control request received by the control request reception unit is accepted. Further, when a priority of the one client terminal device is highest, the determination unit can determine that the control request received by the control request reception unit is accepted. That is, the control request is accepted in accordance with the predetermined condition that "when the priority is highest, the control request is accepted". Therefore, for example, even if the control request of the one client terminal device with the highest priority is accepted to thereby cause a harmful influence in viewing of content information by users of the other client terminal devices, the users of the other client terminal devices can predict the harmful influence. Accordingly, an unpredictable harmful influence is prevented from occurring in viewing of the content information by users of the client terminal devices.

Further, when the control request is not accepted, a user of the client terminal device can know that the control request is not accepted, by the notification unit and the notification output unit. Therefore, user fears caused on the basis that the control request is not accepted, specifically, fears such as "a client terminal device or a server device may be broken" can be eliminated.

According to the second aspect of the invention, the determination unit can determine, based on whether or not the priority of the one client terminal device obtained by the acquisition unit satisfies a predetermined condition, whether or not the control request received by the control request reception unit is accepted. That is, the control request is accepted in accordance with the predetermined condition. Therefore, for example, even if the control request of the one client terminal device is accepted to thereby cause a harmful influence in viewing of content information by users of the other client terminal devices, the users of the other client terminal devices can predict the harmful influence. Accordingly, an unpredictable harmful influence is prevented from occurring in viewing of the content information by users of the client terminal devices.

According to the invention, the same effect as that of the above second aspect can be of course obtained. Further, when the priority of the one client terminal device is highest, the determination unit can determine that the control request received by the control request reception unit is accepted. That is, the control request is accepted in accordance with the predetermined condition that "when the priority is highest, the control request is accepted". Therefore, for example, even if the control request of the one client terminal device with the highest priority is accepted to thereby cause a harmful influence in viewing of content information by users of the other client terminal devices, the users of the other client terminal devices can predict the harmful influence. Accordingly, an unpredictable harmful influence is prevented from occurring in viewing of the content information by users of the client terminal devices.

According to the invention, the same effect as that of the above second aspect can be of course obtained. Further, when the determination unit determines that the control request is not accepted, a notification unit can give a notice that the control request is not accepted, to the one client terminal device which transmits the control request. That is, when the control request is not accepted, a user of the client terminal device can know that the control request is not accepted. Therefore, user fears caused on the basis that the control request is not accepted, specifically, fears such as "a client terminal device or a server device may be broken" can be eliminated.

According to the invention, the same effect as that of the above second aspect can be of course obtained. Further, a priority information reception unit can receive, priority information on the priority in the control for the one content information, from the one client terminal device; and a priority setting unit can set the priority of the one client terminal device in the control for the one content information, to the priority storage unit, based on the priority information received by the priority information reception unit. Accordingly, the priority as the basis of determination whether or not the control request is accepted is surely changed and set based on the priority information. Therefore, an unpredictable harmful influence is further prevented from occurring in viewing of the content information by users of the client terminal devices.

According to the invention, the same effect as that of the above second aspect can be of course obtained. Further, the priority can be set based on the order of starting transmission of the content information. Further, the priority setting unit can invalidate the priority of the one client terminal device which is stored in the priority storage unit, in the control for the one content information, and can advance a priority of the client terminal device which has the priority lower than that of the one client terminal device, in the control for the one content information, by one step, when the priority information reception unit receives the transmission stop request of the one content information or the transmission switching request to the another content information from the one client terminal device as the priority information. Accordingly, the priority as the basis of determination whether or not the control request is accepted is surely changed and set based on the order of starting transmission of the content information. Therefore, an unpredictable harmful influence is further prevented from occurring in viewing of the content information by users of the client terminal devices.

BRIEF DESCRIPTION OF THE DRAWINGS

FIG. 6 is a flowchart for illustrating a processing on a setting of a priority in an acceptance of a control request from a client terminal device by a server device.

DETAILED DESCRIPTION OF THE INVENTION

Preferred embodiments of the present invention will be described in detail below with reference to the drawings. The scope of the invention is not limited to the examples shown in figures.

<Configuration>

First, configurations of a client-server system, a server device and a client terminal device will be described.

[Configuration of Client-Server System]

Figure 1:
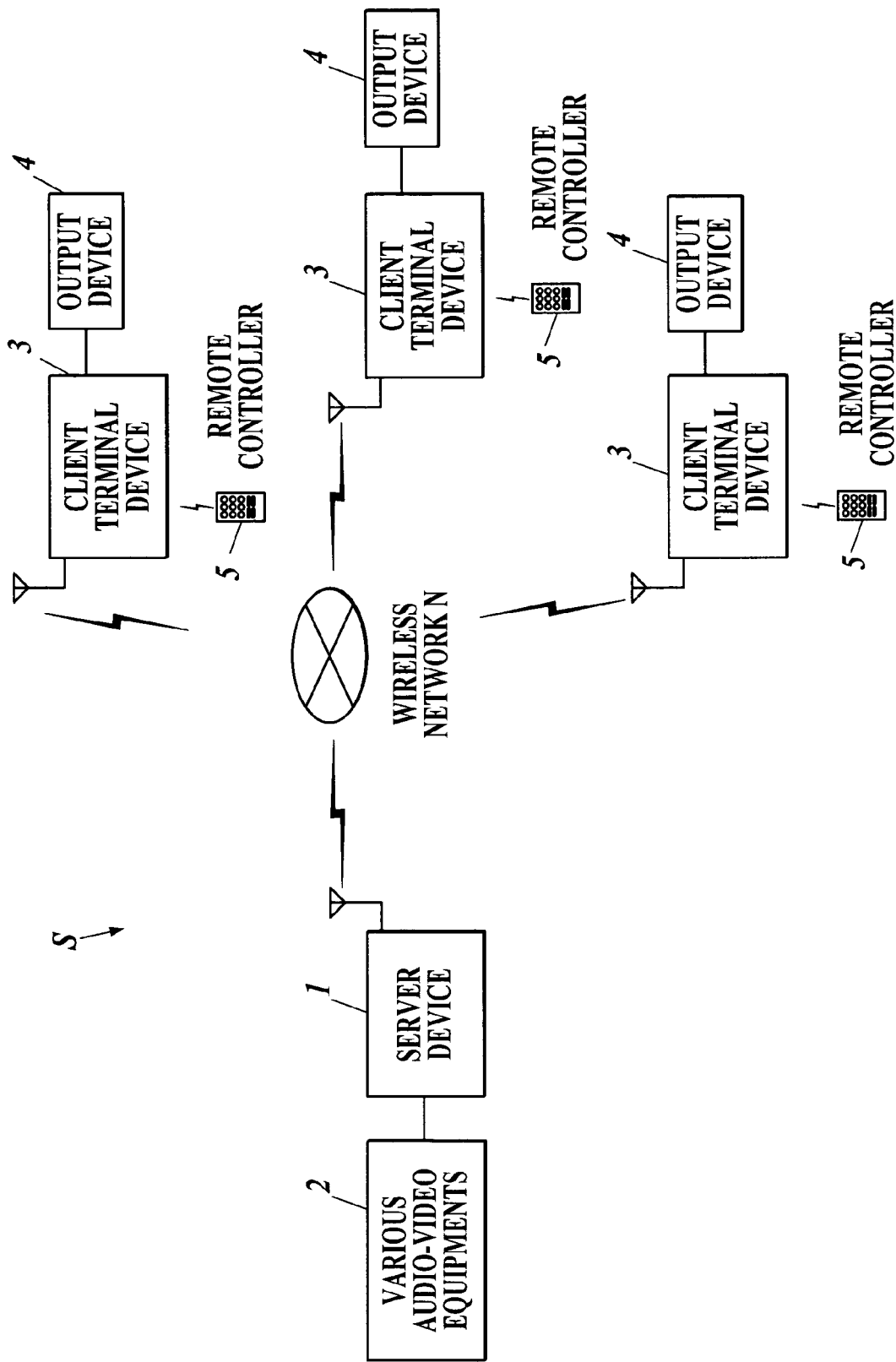
FIG. 1 is a view showing the entire configuration of a client-server system according to an embodiment of the present invention.

As shown in FIG. 1, a client-server system S comprises, for example, a server device having connected thereto various audio-video equipments 2, and a plurality of client terminal devices 3 having connected thereto output devices 4 and capable of being operated by remote controllers 5. The server device 1 and the client terminal devices 3 are connected through a wireless network N and can transmit and receive information to and from each other.

The number of the client terminal devices 3 to the server device 1 is not limited to that of FIG. 1.

Examples of the information to be transmitted to the client terminal devices 3 from the server device 1 include content information. The content information is obtained, for example, from various audio-video equipments 2 connected to the server device 1 and is outputted to the output devices 4 connected to the client terminal devices 3.

Examples of the information to be transmitted to the server device 1 from the client terminal devices 3 include a control request. The control request is a control request over the content information transmitted from the server device 1, such as a request for changing a channel of a TV apparatus 21 (described later) of the various audio-video equipments 2.

Specifically, for example, when receiving a signal on a control request over one content information set from the remote controller 5, the client terminal device 3 transmits the control request corresponding to the signal to the server device 1. The server device 1 which receives the control request executes, for various audio-video equipments 2, the control in response to the control request and transmits the execution result to the client terminal device 3. Further, the client terminal device 3 which receives the execution result outputs the execution result to the output device 4.

Further, information to be transmitted to the server device 1 from the client terminal device 3 also includes as priority information a transmission stop request of one content information set, a transmission switching request to another content information set and a transmission start request of one content information set. In the same manner as in the control request, the transmission stop request, the transmission switching request and the transmission start request are transmitted to the server device 1 from the client terminal device 3 based on the signals on the transmission stop request, the signals on the transmission switching request and the signals on the transmission start request, respectively, which are transmitted to the client terminal device 3 from the remote controller 5, for example, with the depression of an input button of the remote controller 5 by a user.

The transmission stop request is a request for stopping transmission of one content information set. Specifically, the request is, for example, a request for stopping transmission of content information from the TV apparatus 21 (described later) of the various audio-video equipments 2. More specifically, the request is, for example, a request for turning off a power source of the TV apparatus 21 (described later) of the various audio-video equipments 2.

The transmission switching request is a request for stopping transmission of one content information set and for starting transmission of another content information set. Specifically, the request is, for example, a request for stopping transmission of content information from the TV apparatus 21 (described later) of the various audio-video equipments 2 and for starting transmission of content information from the DVD player 22 (described later) of the various audio-video equipments 2.

The transmission start request is a request for starting transmission of one content information set. Specifically, the request is, for example, a request for starting transmission of content information from the TV apparatus 21 (described later) of the various audio-video equipments 2.

The wireless network N is a network such as a wireless LAN (Local Area Network) in accordance with the Bluetooth standard or the IEEE (Institute of Electrical and Electronic Engineers) 802.11 standard.

[Configuration of Server Device]

Figure 2:
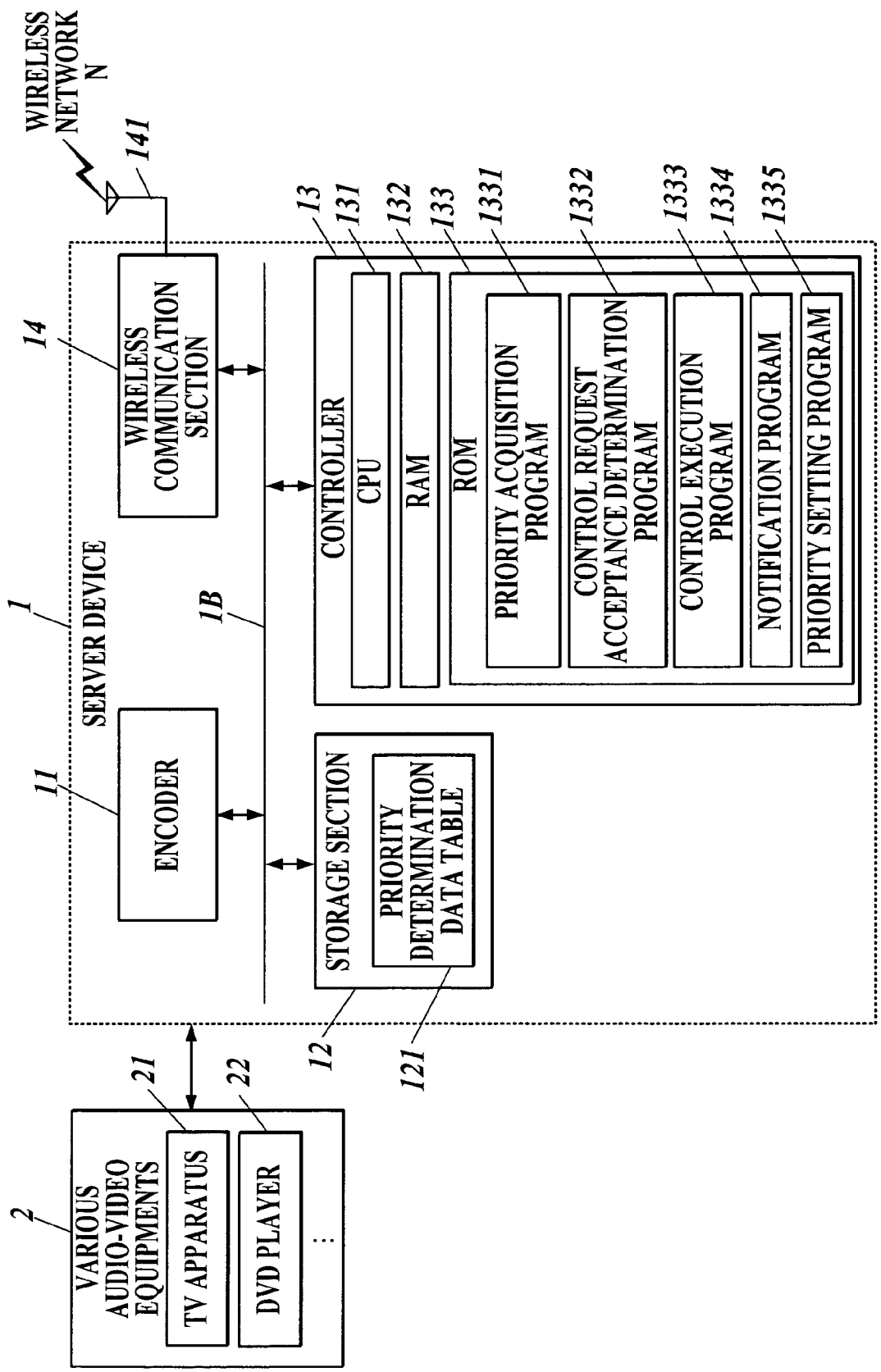
FIG. 2 is a block diagram showing a functional configuration of a server device according to the embodiment of the present invention.

As shown in FIG. 2, the server device 1 comprises, for example, an encoder 11, a storage section 12, a controller 13 and a wireless communication unit 14 as a control request reception unit, a notification unit and a priority information reception unit. The respective sections are connected to each other through a bus 1B. Further, the server device 1 has connected thereto various audio-video equipments 2.

The encoder 11 encodes, for example, content information (video information or audio information) to be inputted to the server device 1 from the various audio-video equipments 2 into compressed content information (compressed video information or compressed audio information) in a predetermined file format. Specifically, the encoder 11 encodes, for example, video information to be inputted to the server device 1 from the various audio-video equipments 2 into compressed video information in the MPEG-2 (Moving Picture Experts Group phase 2) format. Further, the encoder 11 encodes, for example, audio information to be inputted to the server device 1 from the various audio-video equipments 2 into compressed audio information in the AAC (Advanced Audio Coding) format.

As shown in FIG. 2, the storage section 12 stores, for example, a priority determination data table 121 as a priority storage unit.

The priority determination data table 121 correspondingly stores a content identification number as content identification information for identifying content information transmitted to the respective client terminal devices 3 and a priority of the client terminal device 3 in the control over the content information.

Figure 3:
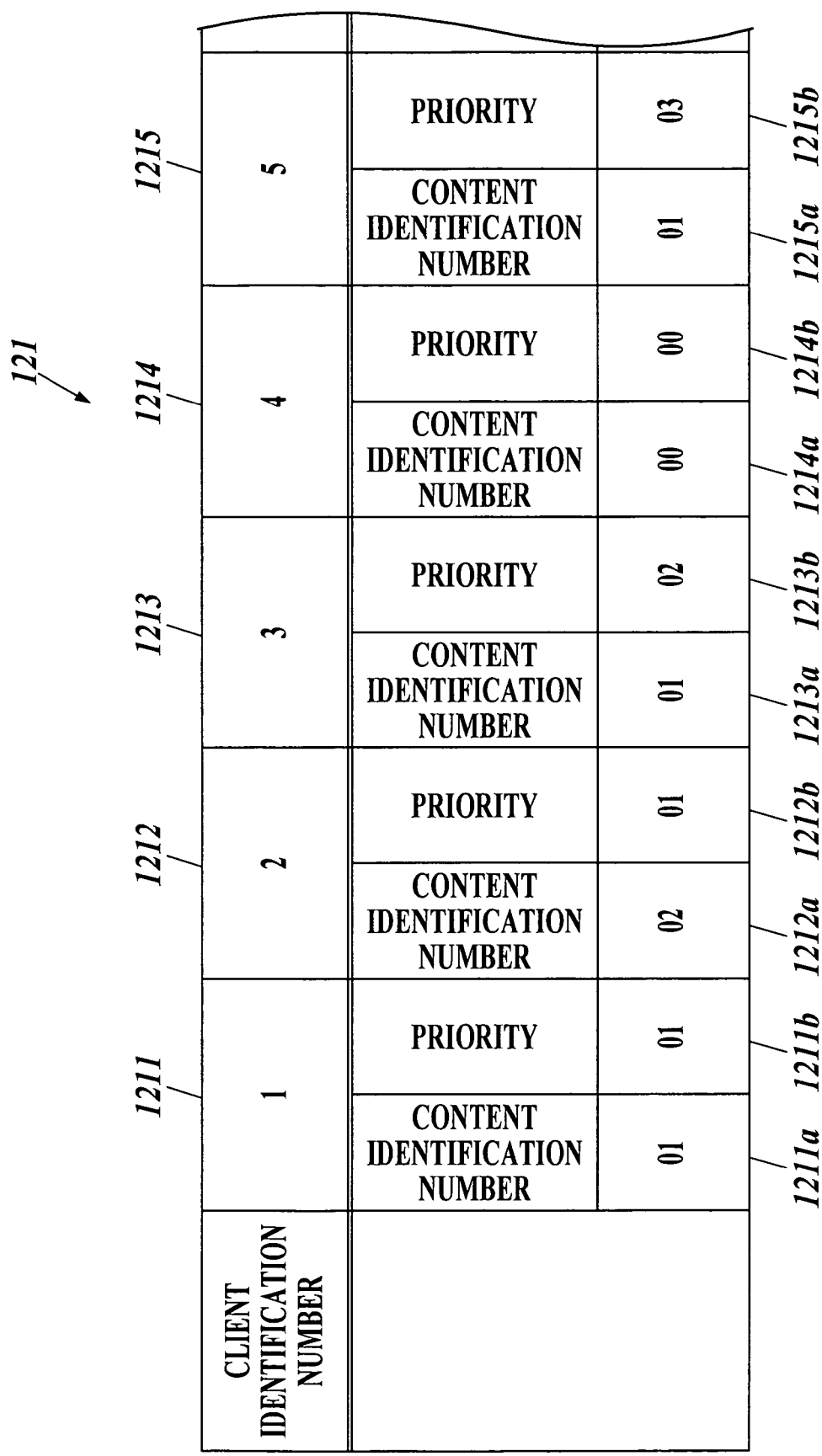
FIG. 3 is a view showing a data structure of a priority determination data table shown in FIG. 2.

Specifically, the priority determination data table 121 has, for example, "client identification number" storage areas 1211, 1212, 1213, 1214, 1215 . . . (hereinafter, referred to as "client identification number" storage areas 1211 . . . ), "content identification number" storage areas 1211a, 1212a, 1213a, 1214a, 1215a . . . (hereinafter, referred to as "content identification number" storage areas 1211a . . . ) and "priority" storage areas 1211b, 1212b, 1213b, 1214b, 1215b . . . (hereinafter, referred to as "priority" storage areas 1211b . . . ), as shown in FIG. 3.

Herein, each of the content identification number and priority corresponding to the same client identification number is, for example, a piece of information having an information amount of 8 bits. Specifically, for example, in the client identification number "1", the content identification number stored in the "content identification number" storage area 1211a is indicated by the high-order 4 bits of 8 bits and the priority stored in the "priority" storage area 1211b is indicated by the low-order 4 bits.

The "client identification number" storage areas 1211 . . . store the client identification numbers for identifying the client terminal devices 3 connectable to the server device 1 through the wireless network N.

The "content identification number" storage areas 1211a . . . store the content identification numbers for identifying the content information transmitted to the client terminal devices 3 with the client identification numbers stored in the "client identification number" storage areas 1211 . . . .

Herein, assume that the "content identification number" storage areas 1211a . . . previously store "00". Further, assume that when the content identification number stored in the "content identification number" storage areas 1211a . . . is "00", no content information is transmitted to the client terminal device 3 with the client identification number corresponding to the content identification number ("00"). That is, in the priority determination data table 121 shown in FIG. 3, no content information is transmitted to the client terminal device 3 with the client identification number "4".

The "priority" storage areas 1211b . . . store a priority, in the control over the content information of the content identification number stored in the "content identification number" storage areas 1211a . . . , of the client terminal device 3 with the client identification number stored in the "client identification number" storage areas 1211 . . . .

Herein, assume that the "priority" storage areas 1211b . . . previously store "00".

As shown in FIG. 2, the controller 13 has, for example, a CPU (Central Processing Unit) 131, a RAM (Random Access Memory) 132 and a ROM (Read Only Memory) 133.

The CPU 131 executes various control operations in accordance with various processing programs for the server device 1 stored in the ROM 133.

The RAM 132 has a program storage area for expanding a processing program executed by the CPU 131 or a data storage area for storing input data or a processing result produced in executing the processing program.

The ROM 133 stores a system program executable in the server device 1, various processing programs executable in the system program, data to be used in executing these various processing programs and data of the processing result computed by the CPU 131. Herein, these programs are stored in the ROM 133 in the form of a program code readable by a computer.

Specifically, the ROM 133 stores, for example, a priority acquisition program 1331, a control request acceptance determination program 1332, a control execution program 1333, a notification program 1334 and a priority setting program 1335, as shown in FIG. 2.

The priority acquisition program 1331 allows the CPU 131 to realize a function of obtaining, based on a control request over one content information set from one client terminal device 3 received by the wireless communication section 14, from the priority determination data table 121 a priority of the one client terminal device 3 in the control over the one content information set.

Specifically, for example, when the wireless communication section 14 receives a control request over one content information set from the wireless communication section 32 (described later) of one client terminal device 3, the CPU 131 executes the priority acquisition program 1331 to thereby obtain from the "priority" storage areas 1211b . . . of the priority determination data table 121 a priority corresponding to the client identification number of the one client terminal device 3 which transmits the control request.

The CPU 131 executes such a priority acquisition program 1331 to thereby serve as an acquisition unit.

The control request acceptance determination program 1332 allows the CPU 131 to realize a function of determining, based on the priority of the one client terminal device 3 obtained through the execution of the priority acquisition program 1331 of the CPU 131, whether or not the control request received by the wireless communication section 14 is accepted.

Specifically, for example, when the CPU 131 executes the priority acquisition program 1331 to thereby obtain a priority of one client terminal device 3, the CPU 131 executes the control request acceptance determination program 1332 to determine, based on the obtained priority of the one client terminal device 3, whether or not the control request over the one content information set which is transmitted from the wireless communication section 32 (described later) of the one client terminal device 3 and which is received by the wireless communication section 14 is accepted. Further, the CPU 131 determines that, for example, when the obtained priority of the one client terminal device 3 is highest as a predetermined condition, the control request over the one content information set received by the wireless communication section 14 is accepted.

The CPU 131 executes such a control request acceptance determination program 1332 to thereby serve as a determination unit.

When the CPU 131 executes the control request acceptance determination program 1332 to thereby determine that a control request is accepted, the control execution program 1333 allows the CPU 131 to realize a function of executing control in response to the control request.

Specifically, for example, when the CPU 131 executes the control request acceptance determination program 1332 to thereby determine that a control request over the one content information set is accepted, the CPU 131 executes the control execution program 1333 to execute the control in response to the control request, for example, for the various audio-video equipments 2.

The CPU 131 executes such a control execution program 1333 to thereby serve as an execution unit.

When the CPU 131 executes the control request acceptance determination program 1332 to thereby determine that a control request is not accepted, the notification program 1334 allows the CPU 131 to realize a function of giving a notice to that effect to the one client terminal device 3 which transmits the control request.

Specifically, for example, when the CPU 131 executes the control request acceptance determination program 1332 to thereby determine that a control request over the one content information set is not accepted, the CPU 131 executes the notification program 1334 to transmit a notice to that effect from the wireless communication section 14 to the wireless communication section 32 (described later) as a notification reception unit of the one client terminal device 3 which transmits the control request.

The CPU 131 executes such a notification program 1334 to thereby serve as a notification unit.

The priority setting program 1335 allows the CPU 131 to realize a function of setting, based on the priority information (a transmission stop request or a transmission switching request) received by the wireless communication section 14, in the priority determination data table 121 the priority of the one client terminal device 3 in the control over the one content information unit.

Specifically, for example, when the wireless communication section 14 receives from the one client terminal device 3 a transmission stop request of the one content information set or a transmission switching request to another content information set, the CPU 131 executes the priority setting program 1335 to invalidate a priority, in the control over the one content information set, of the one client terminal device 3 which is stored in the priority determination data table 121 as well as to advance by one step a priority, in the control over the one content information set, of the client terminal device 3 which has the priority lower than that of the one client terminal device 3.

More specifically, for example, when the wireless communication section 14 receives a transmission stop request or transmission switching request from the wireless communication section 32 (described later) of the one client terminal device 3, the CPU 131 executes the priority setting program 1335 to change into "00" a priority corresponding to the client identification number of the one client terminal device 3 in priorities stored in the "priority" storage areas 1211b . . . of the priority determination data table 121. Further, the CPU 131 executes the priority setting program 1335 to select, before changing into "00" the priority of the one client terminal device 3, the same content identification number as that corresponding to the client identification number of the one client terminal device 3 from among the content identification numbers stored in the "content identification number" storage areas 1211a . . . of the priority determination data table 121. Subsequently, the CPU 131 advances by one step a priority of a client terminal device which has the priority lower than that of the one client terminal device 3 in priorities corresponding to the selected content identification number, which are stored in the "priority" storage areas 1211b. . . of the priority determination data table 121.

The CPU 131 executes such a priority setting program 1335 to thereby serve as a priority setting unit.

The wireless communication section 14 transmits and receives various information sets to and from the client terminal device 3 through the wireless network N. Specifically, the wireless communication section 14 has an antenna 141 and RF (Radio Frequency) converter (not shown) for transmitting and receiving wireless signals to and from the client terminal device 3, and a wireless LAN card (not shown) for the connection to a wireless LAN in accordance with the Bluetooth standard or the IEEE 802.11 standard.

Specifically, the wireless communication section 14 in the present invention transmits, for example, content information (compressed content information) to the wireless communication section 32 (described later) of the client terminal device 3. Further, from the wireless communication section 32 (described later) of one client terminal device 3, the wireless communication section 14 in the present invention receives, for example, as a control request reception unit, a control request over one content information set transmitted to the one client terminal device 3. Further, when the CPU 131 executes the control request acceptance determination program 1332 to thereby determine that a control request over one content information set is not accepted, the wireless communication section 14 in the present invention transmits, for example, as a notification unit, a notice to that effect to the wireless communication section 32 (described later) of one client terminal device 3 which transmits the control request. Further, from one client terminal device 3, the wireless communication section 14 in the present invention receives, for example, as a priority information reception unit, priority information (a transmission stop request or a transmission switching request) on the priority in the control over one content information set.

As shown in FIG. 2, the various audio-video equipments 2 connected to the server device 1 include, for example, the TV apparatus 21 and the DVD (Digital Versatile Disk) player 22. The various audio-video equipments 2 operate under the control from the server device 1. The various audio-video equipments 2 output, for example, content information (video information or audio information) to the server device 1 under such control.

Further, the various audio-video equipments 2 include not only the TV apparatus 21 and DVD player 22 shown in FIG. 2 but also arbitrary suitable audio-video equipments such as a videorecorder, a PVR (Personal Video Recorder), a tuner of a BS (Broadcasting Satellite) broadcasting or CS (Communication Satellite) broadcasting, an STB (Set Top Box) and an audio device.

[Configuration of Client Terminal Device]

Figure 4:
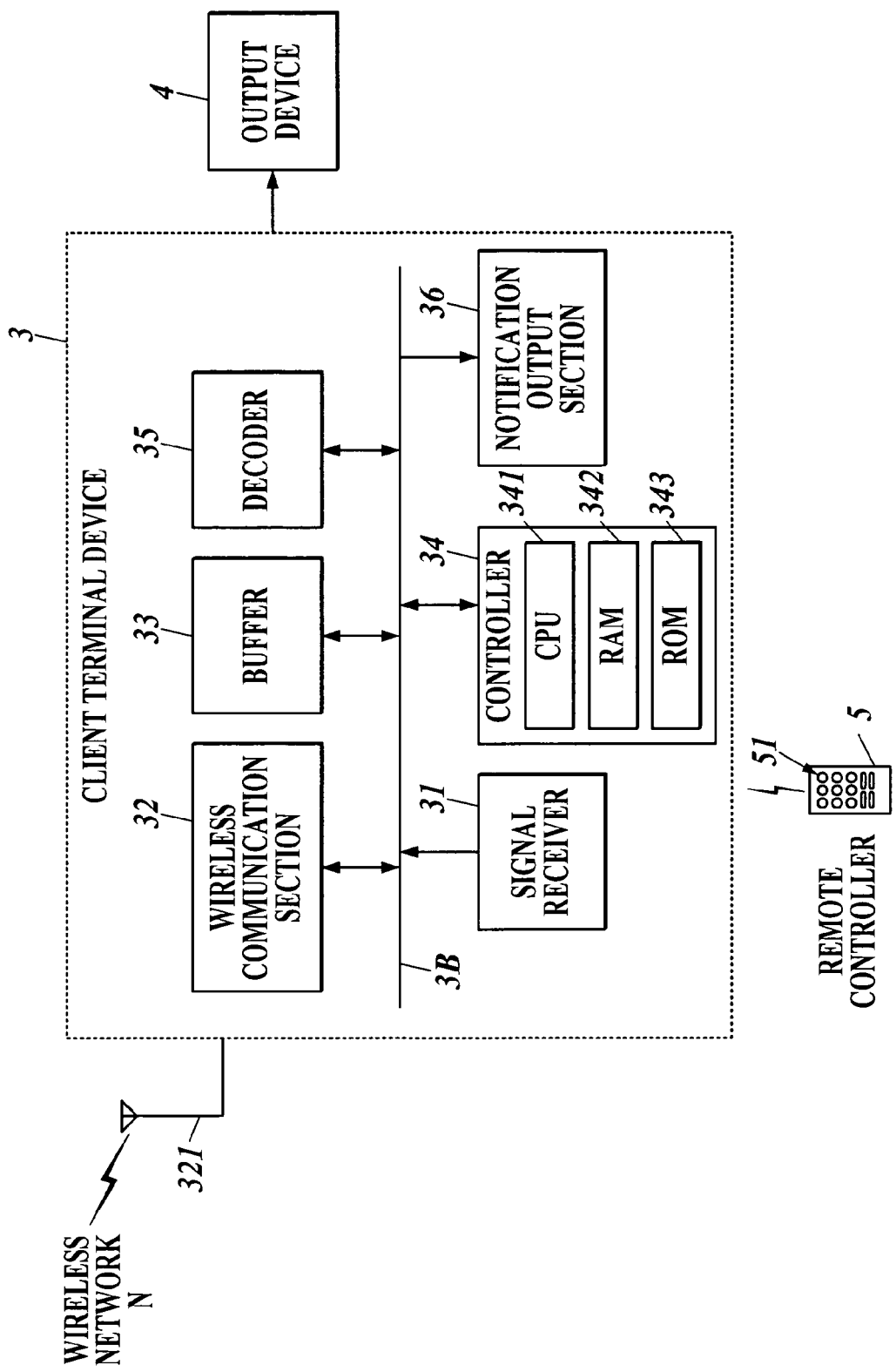
FIG. 4 is a block diagram showing a functional configuration of a client terminal device according to the embodiment of the present invention.

As shown in FIG. 4, the client terminal device 3 comprises, for example, a signal receiver 31, a wireless communication section 32 as a content information reception unit and a notification reception unit, a buffer 33, a controller 34, a decoder 35, and a notification output section 36 as a notification output unit. The respective sections are connected to each other through a bus 3B. Further, the client terminal device 3 has connected thereto the output device 4 and can be operated by the remote controller 5.

The signal receiver 31 receives, for example, various signals transmitted from the remote controller 5.

The wireless communication section 32 has almost the same constitution as that of the wireless communication section 14 in the server device 1, and transmits and receives various information sets to and from the server device 1 through the wireless network N. Specifically, the wireless communication section 32 has an antenna 321 and RF (Radio Frequency) converter (not shown) for transmitting and receiving wireless signals to and from the server device 1, and a wireless LAN card (not shown) for the connection to a wireless LAN in accordance with the Bluetooth standard or the IEEE 802.11 standard.

Specifically, the wireless communication section 32 in the present invention transmits, for example, a control request, a transmission stop request, a transmission switching request or a transmission start request to the wireless communication section 14 of the server device 1. Further, the wireless communication section 32 in the present invention receives, for example, as a content information reception unit, content information transmitted from the wireless communication section 14 of the server device 1. Further, when the CPU 131 of the server device 1 executes the notification program 1334 to thereby transmit from the wireless communication section 14 a notice to the effect that a control request over one content information set is not accepted, the wireless communication section 32 in the present invention receives, for example, as a notification reception unit, a notice to that effect.

The buffer 33 temporarily stores the content information (compressed content information) which is transmitted from the wireless communication section 14 of the server device 1 and received by the wireless communication section 32.

The controller 34 has, for example, a CPU 341, a RAM 342 and a ROM 343 as shown in FIG. 4.

The CPU 341 executes various control operations in accordance with various processing programs for the client terminal device 3 stored in the ROM 343.

The RAM 342 has a program storage area for expanding a processing program to be executed by the CPU 341 or a data storage area for storing input data or a processing result produced in executing the processing program.

The ROM 343 stores a system program executable in the client terminal device 3, various processing programs executable in the system program, data to be used in executing these various processing programs and data of the processing result computed by the CPU 341. Herein, these programs are stored in the ROM 343 in the form of a program code readable by a computer.

Under the control from the CPU 341, for example, the decoder 35 subjects compressed content information (compressed video information or compressed audio information) stored in the buffer 33 to a processing in response to a file format of the compressed content information to thereby decode the compressed content information to content information (video information or audio information).

As a notification output unit, the notification output section 36 outputs a notice that the control request over one content information set which is transmitted from the wireless communication section 14 of the server device 1 and received by the wireless communication section 32 is not accepted. Specifically, the notification output section 36 is composed of, for example, LEDs (Light Emitting Diodes) and when the wireless communication section 32 receives a notice transmitted from the wireless communication section 14, the section 36 lights.

The output device 4 outputs, for example, the content information (video information or audio information) inputted from the client terminal device 3. Specifically, the output device 4 has, for example, a monitor (not shown) for outputting video information or a speaker (not shown) for outputting audio information.

As shown in FIG. 4, the remote controller 5 has, for example, various input buttons 51. For example, when any input button of the various input buttons 51 is depressed by a user, the remote controller 5 transmits signals corresponding to the input button to the signal receiver 31 of the client terminal device 3.

<Processing>

Next, a processing ([control request acceptance processing]) on an acceptance of a control request from the client terminal device 3 by the server device 1 and a processing ([priority setting processing]) on the setting of a priority in an acceptance of a control request from the client terminal device 3 by the server device 1 in the client-server system S will be described.

[Control Request Acceptance Processing]

A processing on an acceptance of a control request from the client terminal device 3 by the server device 1 in the client-server system S will be described with reference to the flowchart of FIG. 5.

First, the CPU 131 of the server device 1 determines whether or not the wireless communication section 14 of the server device 1 receives both of a transmission stop request, a transmission switching request or a transmission start request and a client identification number from the wireless communication section 32 of the client terminal device 3 (step S1).

In step S1, when determining that the wireless communication section 14 receives both of a transmission stop request, a transmission switching request or a transmission start request and a client identification number (step S1; Yes), the CPU 131 executes the after-described priority setting processing (FIG. 6) (step S2). Further, the CPU 131 repeatedly executes the processing after step S1.

On the other hand, in step S1, when determining that the wireless communication section 14 receives neither a transmission stop request, a transmission switching request, a transmission start request, nor a client identification number (step S1; No), the CPU 131 determines whether or not the wireless communication section 14 receives both of a control request and a client identification number from the wireless communication section 32 of the client terminal device 3 (step S3).

In step S3, when determining that the wireless communication section 14 receives neither a control request nor a client identification number (step S3; No), the CPU 131 repeatedly executes the processing after step S1.

On the other hand, in step S3, when determining that the wireless communication section 14 receives both of a control request and a client identification number (step S3; Yes), the CPU 131 executes the priority acquisition program 1331 to thereby obtain, from the "priority" storage areas 1211b . . . of the priority determination data table 121, a priority corresponding to the client identification number received in step S3 (step S4).

Next, the CPU 131 executes the control request acceptance determination program 1332 to thereby determine whether or not the priority obtained in step S4 is highest (step S5).

In step S5, when determining that the priority obtained in step S4 is highest (step S5; Yes), in other words, when determining that the control request received in step S3 is accepted, the CPU 131 executes the control execution program 1333 to thereby execute the control in response to the control request, for example, for the various audio-video equipments 2 (step S6).

Specifically, for example, when the section 14 receives in step S3 a predetermined control request (for example, a request for changing a channel of the TV apparatus 21 of the various audio-video equipments 2) from the client terminal device 3 having the client identification number "1", the CPU 131 obtains in step S4 a priority "01" from the "priority"

storage area 1211b of the priority determination data table 121 shown in FIG. 3 and determines in step S5 that the obtained priority is highest. That is, the CPU 131 determines in step S5 that the control request received in step S3 from the client terminal device 3 having the client identification number "1" is accepted. Next, in step S6, the CPU 131 executes, for the relevant audio-video equipment (e.g., the TV apparatus 21), the control in response to the predetermined control request (for example, a request for changing a channel of the TV apparatus 21 of the various audio-video equipments 2) received in step S3.

Next, the CPU 131 transmits the execution result in step S6 from the wireless communication section 14 to the wireless communication section 32 of the client terminal device 3 having the client identification number received in step S3 (step S7). Further, the CPU 131 repeatedly executes the processing after step S1 again.

On the other hand, when determining in step S5 that the priority obtained in step S4 is not highest (step S5; No), in other words, when determining that the control request received in step S3 is not accepted, the CPU 131 executes the notification program 1334 to thereby give a notice to that effect from the wireless communication section 14 to the wireless communication section 32 of the client terminal device 3 having the client identification number received in step S3 (step S8).

[Priority Setting Processing]

A processing on the setting of a priority in an acceptance of a control request from the client terminal device 3 by the server device 1 will be described with reference to the flowchart of FIG. 6.

First, the CPU 131 of the server device 1 determines whether or not a request received in step S1 (FIG. 5) by the wireless communication section 14 of the server device 1 is a transmission stop request (step S201).

In step S201, when determining that the request received by the section 14 is a transmission stop request (step S201; Yes), the CPU 131 executes the priority setting program 1335 to thereby update based on the order starting the transmission of content information a priority, in the control over the content information on the transmission stop request, of other client terminal devices except for the client terminal device 3 which transmits the transmission stop request received in step S1 (FIG.5) (step S202).

Specifically, for example, assume that in step S1 (FIG. 5), the section 14 receives a predetermined transmission stop request (a request for stopping transmission of the content information of the content identification number "01") from the client terminal device 3 with the client identification number "3". From the priority determination data table 121 shown in FIG. 3, the CPU 131 first selects, for example, the content identification number (the respective corresponding client identification numbers are "1" and "5") stored in the "content identification number" storage areas 1211a and 1215a, which is the same as the content identification number ("01") corresponding to the client identification number (e.g., "3") received in step S1 (FIG. 5). Next, from among priorities corresponding to the selected content identification number, the CPU 131 extracts a priority "03" (the corresponding client identification number is "5") stored in the "priority" storage area 1215b, which is lower than a priority ("02") corresponding to the client identification number (e.g., "3") received in step S1 (FIG. 5). Next, the CPU 131 advances by one step the extracted priority "03" to thereby change it into a priority "02" and allows the changed priority "02" to be stored in the "priority" storage area 1215b.

Next, the CPU 131 executes the priority setting program 1335 to thereby change the priority of the client terminal device 3 which transmits the transmission stop request received in step S1 (FIG. 5) into "00" (step S203).

Specifically, in the priority determination data table 121 shown in FIG. 3, the CPU 131 changes, for example, the priority "02" stored in the "priority" storage area 1213b, which corresponds to the client identification number (e.g., "3") received in step S1 (FIG. 5), into "00".

Next, the CPU 131 changes the content identification number of the client terminal device 3 which transmits the transmission stop request received in step S1 (FIG. 5) into "00" (step S204). Thus, the processing is completed.

Specifically, in the priority determination data table 121 shown in FIG. 3, the CPU 131 changes, for example, the content identification number "01" stored in the "content identification number" storage area 1213a, which corresponds to the client identification number (e.g., "3") received in step S1 (FIG. 5), into "00".

On the other hand, in step S201, when determining that the received request is not a transmission stop request (step S201; No), the CPU 131 determines whether or not the request received by the section 14 in step S1 (FIG. 5) is a transmission switching request (step S205).

In step S205, when determining that the received request is a transmission switching request (step S205; Yes), the CPU 131 executes the priority setting program 1335 to execute almost the same processing as that in step S202 and thereby, updating based on the order starting the transmission a priority, in the control over the content information on the transmission switching request, of other client terminal devices 3 except for the client terminal device 3 which transmits the transmission switching request received in step S1 (FIG.5) (step S206).

Specifically, for example, assume that in step S1 (FIG. 5), the section 14 receives a predetermined transmission switching request (a request for stopping transmission of the content information of the content identification number "01" and for starting transmission of the content information of the content identification number "02") from the client terminal device 3 with the client identification number "1". From the priority determination data table 121 shown in FIG. 3, the CPU 131 first selects, for example, the content identification number (the respective corresponding client identification numbers are "3" and "5") stored in the "content identification number" storage areas 1213a and 1215a, which is the same as the content identification number ("01") corresponding to the client identification number (e.g., "1") received in step S1 (FIG. 5). Next, from among priorities corresponding to the selected content identification numbers, the CPU 131 extracts the priorities "02" and "03" (the respective corresponding client identification numbers are "3" and "5") stored in the "priority" storage areas 1213b and 1215b, which are lower than the priority ("01") corresponding to the client identification number (e.g., "1") received in step S1 (FIG. 5). Next, the CPU 131 advances by one step the extracted priorities "02" and "03" to thereby change the priorities into priorities "01" and "02" and allows the changed priority "01" to be stored in the "priority" storage area 1213b as well as allows the changed priority "02" to be stored in the "priority" storage area 1215b.

Next, the CPU 131 executes the priority setting program 1335 to execute almost the same processing as that in step S203, thereby changing the priority of the client terminal device 3 which transmits the transmission switching request received in step S1 (FIG. 5) into "00" (step S207).

Specifically, in the priority determination data table 121 shown in FIG. 3, the CPU 131 changes, for example, the priority "01" stored in the "priority" storage area 1211*b*, which corresponds to the client identification number (e.g., "1") received in step S1(FIG. 5), into "00".

Next, the CPU 131 changes the content identification number of the client terminal device 3 which transmits the transmission switching request received in step S1 (FIG. 5) (step S208).

Figure 5:
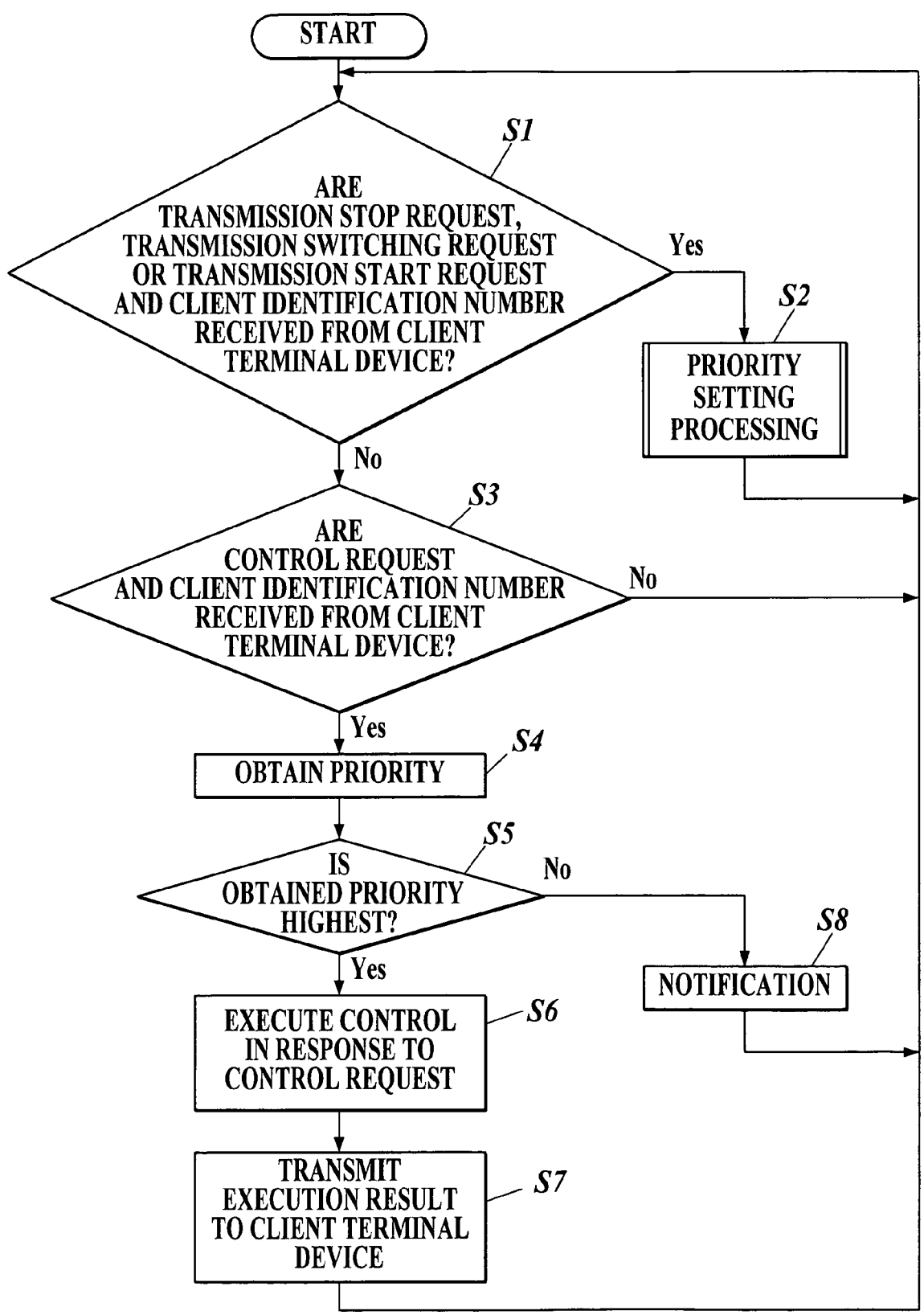
FIG. 5 is a flowchart for illustrating a processing on an acceptance of a control request from a client terminal device by a server device, in a client-server system.

Specifically, in the priority determination data table 121 shown in FIG. 3, the CPU 131 changes, for example, the content identification number "01" stored in the "content identification number" storage area 1211*a*, which corresponds to the client identification number (e.g., "1") received in step S1 (FIG. 5), into the content identification number "02" of the content information of which the transmission is required to be started by the predetermined transmission switching request (a request for stopping transmission of the content information of the content identification number "01" and for starting transmission of the content information of the content identification number "02") received in step S1 (FIG. 5).

Next, based on the order starting the transmission of the content information, the CPU 131 sets the priority of the client terminal device 3 which transmits the transmission switching request received in step S1 (FIG. 5) (step S209). Thus, the processing is completed.

Specifically, from the priority determination data table 121 shown in FIG. 3, the CPU 131 first selects, for example, the content identification number (the corresponding client identification number is "2") stored in the "content identification number" storage area 1212*a*, which is the same as the content identification number ("02") changed in step S208. Next, from among priorities corresponding to the selected content identification numbers, the CPU 131 extracts the lowest priority "01" (the corresponding client identification number is "2") stored in the "priority" storage area 1212*b*. Next, the CPU 131 allows a priority "02" lower than the extracted priority "01" by one step to correspond to the content identification number changed in step S208 as well as to be stored in the "priority" storage area 1211*b*.

On the other hand, in step S205, when determining that the received request is not a transmission switching request (step S205; No), that is, when determining that the request received in step S1 (FIG. 5) is a transmission start request, the CPU 131 sets the content identification number of the client terminal device 3 which transmits the transmission start request received in step S1 (FIG. 5) (step S210).

Specifically, for example, assume that in step S1 (FIG.5), the section 14 receives a predetermined transmission start request (a request for starting transmission of the content information of the content identification number "01") from the client terminal device 3 with the client identification number "4". In the priority determination data table 121 shown in FIG. 3, the CPU 131 changes, for example, the content identification number "00" stored in the "content identification number" storage area 1214*a*, which corresponds to the client identification number (e.g., "4") received in step S1 (FIG. 5), into the content identification number "01" of the content information of which the transmission is required to be started by the predetermined transmission start request (a request for starting transmission of the content information of the content identification number "01") received in step S1 (FIG. 5) and sets the content identification number "01".

The content identification number before being changed in step S210 is necessarily "00".

Next, the CPU 131 executes almost the same processing as that in step S209 to thereby set, based on the order starting the transmission of the content information, a priority of the client terminal device 3 which transmits the transmission start request received in step S1 (FIG. 5) (step S211). Thus, the processing is completed.

Specifically, from the priority determination data table 121 shown in FIG. 3, the CPU 131 first selects, for example, the content identification number (the respective corresponding client identification numbers are "1", "3" and "5") stored in the "content identification number" storage areas 1211*a*, 1213*a* and 1215*a*, which is the same as the content identification number ("01") set in step S210. Next, from among the priorities corresponding to the selected content identification numbers, the CPU 131 extracts the lowest priority "03" (the corresponding client identification number is "5") stored in the "priority" storage area 1215*b*. Next, the CPU 131 allows a priority "04" lower than the extracted priority "03" by one step to correspond to the content identification number which is set in step S210 as well as to be stored in the "priority" storage area 1214*b*.

According to the above-described server device 1 and client-server system S of the present invention, the priority determination data table 121 can correspondingly store the content identification information for identifying the content information transmitted to each of the client terminal devices 3 and the priority of the client terminal device 3 in the control over the content information. The wireless communication section 14 can receive from one client terminal device 3 the control request over one content information set transmitted to the one client terminal device 3. The CPU 131 executes the priority acquisition program 1331 to thereby obtain, from the priority determination data table 121, a priority of the one client terminal device 3 in the control over the one content information set, based on the control request over the one content information set from the one client terminal device 3 received by the wireless communication section 14. Further, the CPU 131 executes the control request acceptance determination program 1332 to thereby determine, based on the priority of the one client terminal device 3 obtained through the execution of the priority acquisition program 1331 of the CPU 131, whether or not the control request over one content information set received by the wireless communication section 14 is accepted. Further, when executing the control request acceptance determination program 1332 to thereby determine that a control request over the one content information set is accepted, the CPU 131 executes the control execution program 1333 to thereby executes control in response to the control request, for example, for the various audio-video equipments 2. Further, the CPU 131 which executes the control request acceptance determination program 1332 can determine that when the priority of the one client terminal device 3 is highest, the control request over the one content information set received by the wireless communication section 14 is accepted. That is, the control request is accepted in accordance with the predetermined condition that "when the priority is highest, the control request is accepted". Therefore, for example, even if the control request of the one client terminal device 3 with the highest priority is accepted to thereby cause a harmful influence in viewing of content information by users of the other client terminal devices 3, the users of the other client terminal devices 3 can predict the harmful influence. Accordingly, an unpredictable harmful influence is prevented from occurring in viewing of content information by users of client terminal devices 3.

Further, the priority can be set based on the order starting the transmission of the content information, and the wireless communication section 14 can receive as the priority information a transmission stop request of the one content information set or a transmission switching request to another content information set. The CPU 131 executes the priority setting program 1335, thereby, when the wireless communication section 14 receives from the one client terminal device 3 the transmission stop request or the transmission switching request, invalidating a priority, in the control over the one content information set, of the one client terminal device 3 which is stored in the "priority" storage areas 1211b . . . of the priority determination data table 121 as well as advancing by one step a priority, in the control over the one content information set, of the client terminal device 3 which has the priority lower than that of the one client terminal device 3. Accordingly, the priority as the basis of determination whether or not the control request is accepted is surely changed and set based on the order starting transmission of the content information. Therefore, an unpredictable harmful influence is further prevented from occurring in viewing of the content information by users of the client terminal devices 3.

Further, when executing the control request acceptance determination program 1332 to thereby determine that a control request over the one content information set is not accepted, the CPU 131 executes the notification program 1334 to thereby allow the wireless communication section 14 to give a notice to that effect to the one client terminal device 3 which transmits the control request. Further, a user of the client terminal device 3, when the control request is not accepted, can be notified to that effect by the notification output section 36 of the client terminal device 3. Therefore, user fears caused on the basis that the control request is not accepted, specifically, fears such as "the client terminal device 3 or the server device 1 may be broken" can be eliminated.

The present invention is not limited to the above-described embodiment, and alterations can be made therein as appropriate without departing from spirit and scope of the inventions.

For example, the various audio-video equipments 2 as well as arbitrary suitable equipments capable of providing content information to the client terminal device 3 may be connected to the server device 1. Further, the content information may be provided from the various audio-video equipments 2 connected to the server device 1 as well as may be stored in the ROM 133 of the server device 1.

Further, in a case where for the predetermined condition, the priority of one client terminal device 3 is highest, the CPU 131 which executes the control request acceptance determination program 1332 determines that the control request over the one content information set from the one client terminal device 3 is accepted; however, the present invention is not limited thereto. That is, for example, in a case where for the predetermined condition, the priority of one client terminal device 3 is within the predetermined range, the CPU 131 which executes the control request acceptance determination program 1332 may determine that the control request over the one content information set from the one client terminal device 3 is accepted.

Further, a transmission stop request, a transmission switching request and a transmission start request are received as priority information and a priority is set based on the order starting transmission of the content information; however, the priority information or a method for setting the priority is not limited thereto. For example, the priority information may be user identification information (e.g., a user ID or a password) of users who use the client terminal devices 3, and the priority may be set based on the priorities (user priorities) of users.

Specifically, for example, a "user priority data table" for correspondingly storing user identification information and a user priority of a user having the user identification information is stored in the storage section 12. When the wireless communication section 14 receives both of a transmission switching request or a transmission start request and a client identification number as well as user identification information, the CPU 131 executes the priority setting program 1335 to thereby first obtain a user priority corresponding to the received user identification information from the "user priority data table". Subsequently, from the "user priority data table", the CPU 131 selects user priorities of users who use other client terminal devices 3 which transmit the same content information as the one content information set of which the transmission is required to be started by the received transmission switching request or transmission start request. Subsequently, based on the obtained user priority and the selected user priorities, the CPU 131 determines the priorities, in the control over the one content information set, of all the client terminal devices 3 which transmit the one content information set. Then, the CPU 131 may store each of the determined priorities in one relevant storage area of the "priority" storage areas 1211b . . . of the priority determination data table 121.

Further, the priority information is not just a transmission stop request, a transmission switching request and a transmission start request or a user identification number. As long as being transmitted from the one client terminal device 3 and relating to a priority in the control over one content information set, the priority information is not particularly limited.

Further, a plurality of priority information sets may be combined to set the priority.

Further, a notification output method using the notification output section 36 is not particularly limited as long as it can give users of the client terminal devices 3 a notice to the effect that the control request is not accepted. For example, an output may be executed, for example, using voice in addition to an output using display. That is, specifically, when the wireless communication section 32 receives from the wireless communication section 14 of the server device 1 a notice to the effect that the control request is not accepted, the notification output section 36 may output the effect using voice.

Further, the output device 4 may serve as the notification output section 36. That is, the output device 4 may serve as a notification output unit.

The entire disclosure of Japanese Patent Application No. Tokugan 2005-142359 filed on May 16, 2005 including specification, claims, drawings and summary are incorporated herein by reference in its entirety.

What is claimed is:

1. A client-server system, comprising:
a plurality of client terminal devices; and
a server device which transmits and receives information to and from the plurality of client terminal devices, the plurality of client terminal devices and the server device being connected through a wireless network, wherein the server device comprising:
a priority storage unit which stores a priority determination data table in which a content identification number for identifying content information transmitted to each client terminal device, a priority of the client terminal device in a control for the content information and a client identification number for identifying the client terminal device are included so as to correspond to each other;

a control request reception unit which receives a control request for one content information transmitted to the one client terminal device, from one client terminal device;

an acquisition unit which obtains a priority of the one client terminal device in the control for the one content information, from the priority storage unit, based on the control request from the one client terminal device, which is received by the control request reception unit;

a determination unit which determines whether or not the control request received by the control request reception unit is accepted, based on the priority of the one client terminal device, which is obtained by the acquisition unit;

an execution unit which executes control in response to the control request when the determination unit determines that the control request is accepted; and a notification unit which gives a notice that the determination unit determines that the control request is not accepted, to the one client terminal device which transmits the control request, when the determination unit determines that the control request is not accepted, wherein when the priority of the one client terminal device is highest, the determination unit determines that the control request received by the control request reception unit is accepted, and wherein the client terminal device comprising:

a content information reception unit which receives the content information transmitted from the server device;

a notification reception unit which receives the notice that the control request is not accepted, the notice being transmitted from the notification unit; and a notification output unit which outputs the notice received by the notification reception unit.

2. A server device which transmits and receives information to and from a plurality of client terminal devices connected through a wireless network, comprising:

a priority storage unit which stores a priority determination data table in which a content identification number for identifying content information transmitted to each client terminal device, a priority of the client terminal device in a control for the content information and a client identification number for identifying the client terminal device are included so as to correspond to each other;

a control request reception unit which receives a control request for one content information transmitted to the one client terminal device, from one client terminal device;

an acquisition unit which obtains a priority of the one client terminal device in the control for the one content information, from the priority storage unit, based on the control request from the one client terminal device, which is received by the control request reception unit;

a determination unit which determines whether or not the control request received by the control request reception unit is accepted, based on whether or not the priority of the one client terminal device, which is obtained by the acquisition unit satisfies a predetermined condition; and an execution unit which executes control in response to the control request when the determination unit determines that the control request is accepted.

3. The server device as claimed in claim 2, wherein the determination unit determines that the control request received by the control request reception unit is accepted when the priority of the one client terminal device is highest.

4. The server device as claimed in claim 2, further comprising:

a notification unit which gives a notice that the determination unit determines that the control request is not accepted, to the one client terminal device which transmits the control request, when the determination unit determines that the control request is not accepted.

5. The server device as claimed in claim 2, further comprising:

a priority information reception unit which receives priority information on the priority in the control for the one content information, from the one client terminal device; and a priority setting unit which sets the priority of the one client terminal device in the control for the one content information, to the priority storage unit, based on the priority information received by the priority information reception unit.

6. The server device as claimed in claim 5, wherein the priority is set based on order of starting transmission of the content information, the priority information reception unit receives a transmission stop request of the one content information or a transmission switching request to another content information, as the priority information, and the priority setting unit invalidates the priority of the one client terminal device which is stored in the priority storage unit, in the control for the one content information, and advances a priority of the client terminal device which has the priority lower than that of the one client terminal device, in the control for the one content information, by one step, when the priority information reception unit receives the transmission stop request of the one content information or the transmission switching request to the another content information from the one client terminal device.

* * * * *

UNITED STATES PATENT AND TRADEMARK OFFICE
CERTIFICATE OF CORRECTION

| | | |
|---|---|---|
| PATENT NO. | : 7,650,391 B2 | Page 1 of 1 |
| APPLICATION NO. | : 11/431525 | |
| DATED | : January 19, 2010 | |
| INVENTOR(S) | : Masahiro Hashimoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Eighteenth Day of January, 2011

David J. Kappos
*Director of the United States Patent and Trademark Office*